United States Patent
Swensen

(10) Patent No.: US 6,214,242 B1
(45) Date of Patent: Apr. 10, 2001

(54) DIRECT INJECTION AIR STRIPPING METHOD AND APPARATUS

(76) Inventor: Frederick B. Swensen, 6824 Peters Pike, Dayton, OH (US) 45414

(*) Notice: Subject to any disclaimer, the term of this patent is extended or adjusted under 35 U.S.C. 154(b) by 0 days.

(21) Appl. No.: 09/427,990

(22) Filed: Oct. 27, 1999

Related U.S. Application Data
(60) Provisional application No. 60/108,839, filed on Nov. 18, 1998.

(51) Int. Cl.$^7$ ............................................. C02F 1/00
(52) U.S. Cl. ....................... 210/767; 210/252; 210/255; 210/262; 210/908; 261/76; 261/78.2; 95/169; 95/170; 95/204; 95/223; 95/237; 96/207; 96/215
(58) Field of Search ................................. 210/188, 767, 210/252, 255, 262, 908; 95/149, 156, 159, 160, 163, 164, 169, 170, 185, 186, 243, 245, 246, 247, 266, 204, 223, 237; 96/312, 207, 215; 261/77, 78, 76, 78.2

(56) References Cited

U.S. PATENT DOCUMENTS

| | | | |
|---|---|---|---|
| 1,801,178 | * | 4/1931 | Sim ........................................ 95/266 |
| 3,542,196 | * | 11/1970 | Madlung, Jr. .......................... 95/266 |
| 3,616,599 | * | 11/1971 | Burnham, Sr. ......................... 95/266 |
| 3,898,058 | * | 8/1975 | McGill ................................... 95/246 |
| 4,378,978 | * | 4/1983 | Andersson et al. .................... 95/266 |
| 4,696,739 | * | 9/1987 | Pedneault ............................ 210/121 |
| 4,824,445 | * | 4/1989 | Minkkinen ............................ 95/247 |
| 5,470,478 | * | 11/1995 | Leva ................................... 210/634 |

FOREIGN PATENT DOCUMENTS

| | | | |
|---|---|---|---|
| 2088240 | * | 6/1982 | (GB) .................................... 95/247 |
| 2223960 | * | 4/1990 | (GB) .................................... 95/245 |

* cited by examiner

*Primary Examiner*—Robert Popovics
(74) *Attorney, Agent, or Firm*—William Weigl

(57) ABSTRACT

A method and apparatus for stripping a volatile compound from waste water comprises creating a high velocity spray of air and stream of water at a first inlet to a first expansion chamber to volatize the compound, recombining the water and air flow through a second and successive expansion chambers and recreating a spray at each such chamber, whereby additional volatile compounds are released from the water at each stage to steadily reduce the contamination of the water. The decontaminated water and volatile compound-laden air are separately collected after exiting the last expansion chamber.

17 Claims, 2 Drawing Sheets

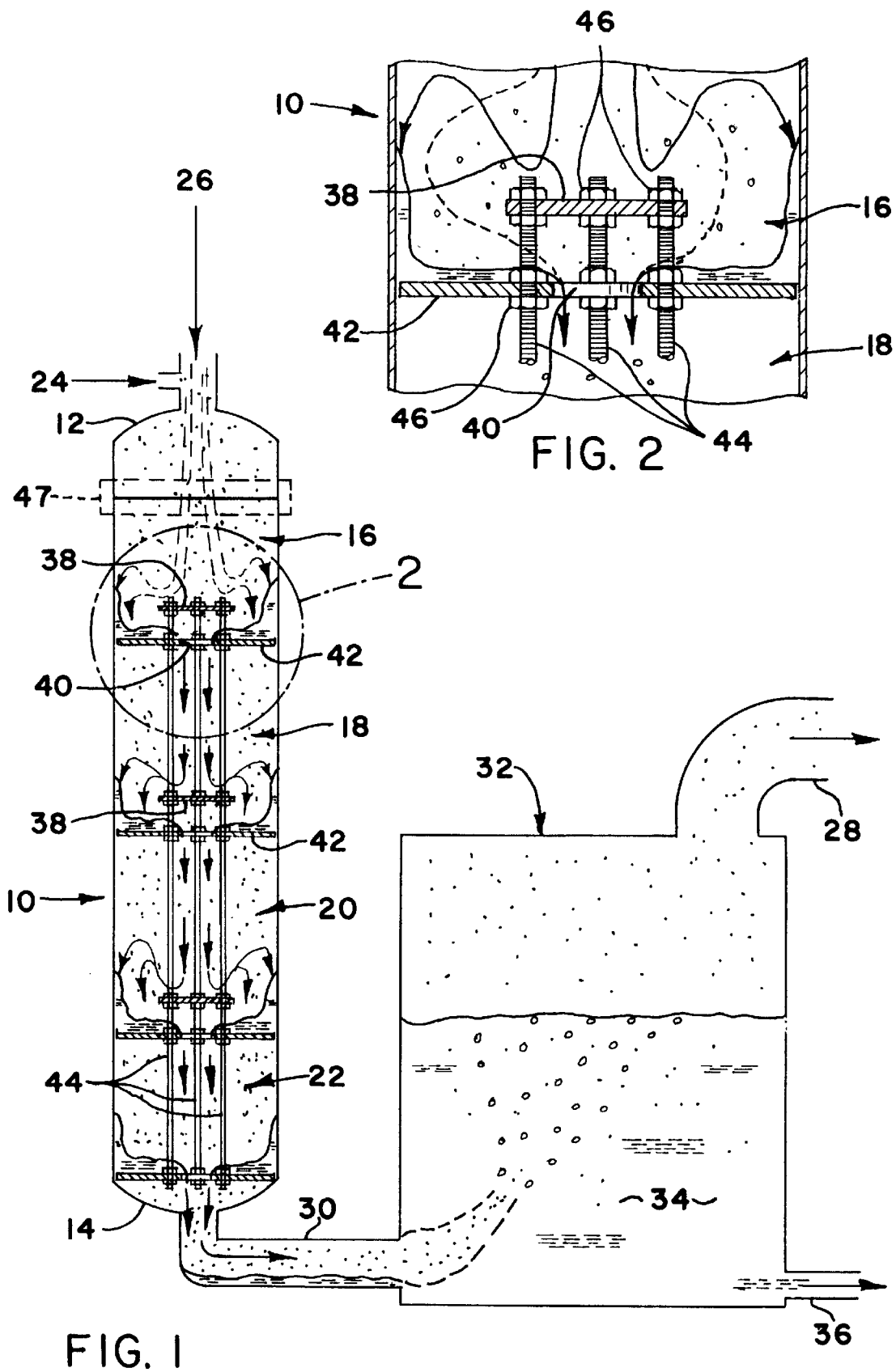

DIRECT INJECTION AIR STRIPPING METHOD AND APPARATUS

This application is based on my U.S. Provisional Patent Application Ser. No. 60/108,839, filed Nov. 18, 1998.

This invention relates to a method of and device for stripping volatile organic and similar compounds from a non-volatile liquid such as water that is contaminated with such compounds, in order to enable the liquid to be reused for purposes where any remaining contamination is acceptable for such use.

BACKGROUND OF THE INVENTION

Water has long been recognized as one of the earth's most precious resources. Recent scientific reports have indicated that the population of the earth may double by the year 2050, placing severe stress on the supply of fresh water available for human use, crops, livestock and other needs where only relatively clean water is acceptable to meet the requirements. In many areas, the demand for fresh water already exceeds the supply, and the situation is only expected to worsen. Desalinization is not always an option, because it ordinarily requires that a nearby source of salt water be available. Cost also continues to be comparatively excessive. Desalinization is customarily confined to areas where fresh water is either scarce or unavailable.

Many industrial uses of water result in contamination with volatile organic compounds (VOC's) such as oils, gasoline, benzene, etc., to the extent that the degraded water is no longer fit for other purposes. A number of methods of treatment of VOC-contaminated waste water have been in use for a considerable period. They typically involve aerating the waste water to cause separation of the VOC's from the water by providing for their molecular attachment to air, discharging the separated VOC's and air and letting the water flow by gravity or by being pumped to a collection point for the now-decontaminated liquid Examples of apparatus for practicing the method are illustrated in U.S. Pat. Nos. 4,544,488, 5,266,208, 5,470,478, 5,685,976 and 5,069,796. This prior art demonstrates various types of towers and tanks in which forced air is passed upwardly through descending water moving by gravity from one perforated, shallow tray to another or through a bed of particulate material, ordinarily by bubbling the air through the water from below to create a froth of the contaminant, and then separately collecting the then-contaminated air and decontaminated water. Other of these systems utilize charcoal or carbon to finally adsorb the last-remaining organic materials when the water is to be stripped completely of contaminants. Typically, while such systems are effective to one degree or another, they generally suffer to some extent from being labor-intensive in requiring frequent disassembly and cleaning and from being complex in structure. Obviously, decontamination of a processed liquid cannot be performed satisfactorily by equipment that collects contaminant internally during processing and retains some of the contaminating substance within the equipment after processing. None of the equipment of the above-mentioned prior art systems can be said to be self-cleaning.

Additionally, it is typical to provide demisting apparatus with conventional air strippers, increasing the overall cost of the equipment and necessitating that the demisting means also require periodic disassembly and cleaning.

SUMMARY OF THE INVENTION

A method of and apparatus for stripping a volatile compound from waste water combine a high velocity stream of air and water to create a spray at a first inlet to a first expansion chamber to volatize the compound and commences air/water blending, and thereafter recombine the water and air flow through a second and further successive expansion chambers while recreating a blended spray at each such chamber, whereby additional volatile compounds are released from the water at each stage to steadily reduce the contamination of the water as stripping progresses. The decontaminated water and volatile compound-laden air are automatically demisted and separately collected after exiting the last expansion chamber. The apparatus is essentially self-cleaning and thus requires only nominal, occasional maintenance. Down time for disassembly and cleaning of the equipment is essentially eliminated, but in any event, is kept to a minimum. The structure is such that, even in the occasional instances where cleaning is required, it can be accomplished easily, quickly and efficiently.

While demisting apparatus is ordinarily required at the collection point of air and water of prior art air stripping systems, I provide for automatic demisting of the air within a collection or separation chamber itself, thereby eliminating the need for a conventional large equipment stack for that purpose.

It is a principal object of this invention to provide an air stripping method and apparatus that operates to more effectively reduce organic contaminants from water than known systems.

A major benefit from this invention is achievement of the principal object with an apparatus which is essentially self-cleaning.

Another object is to provide an apparatus that can be easily constructed from conventional, relatively low cost materials, without requiring use of easily-cloggable, fine nozzles and orifices.

Still another object is to provide a single vertical air stripping tank which can be divided into a plurality of separate, individual expansion chambers by means of a drop-in unitary set of spaced and interconnected impingement and focusing plates.

Another object is to enable the construction of the primary apparatus of my invention either as a single tall vertical unit or a low sequentially-segmented unit in which short interconnected segments are arranged parallel horizontally and stacked vertically.

Other objects and advantages will become apparent from the following description, in which reference is made to the accompanying drawings.

BRIEF DESCRIPTION OF THE DRAWINGS

FIG. 1 is a simplified elevational cross-sectional view of a preferred form of air stripping apparatus for practicing the method of my invention.

FIG. 2 is an enlarged fragmentary view of a portion of the apparatus contained within the dot-dash circle 2 of FIG. 1.

DESCRIPTION OF THE PREFERRED EMBODIMENTS

Figure 3:
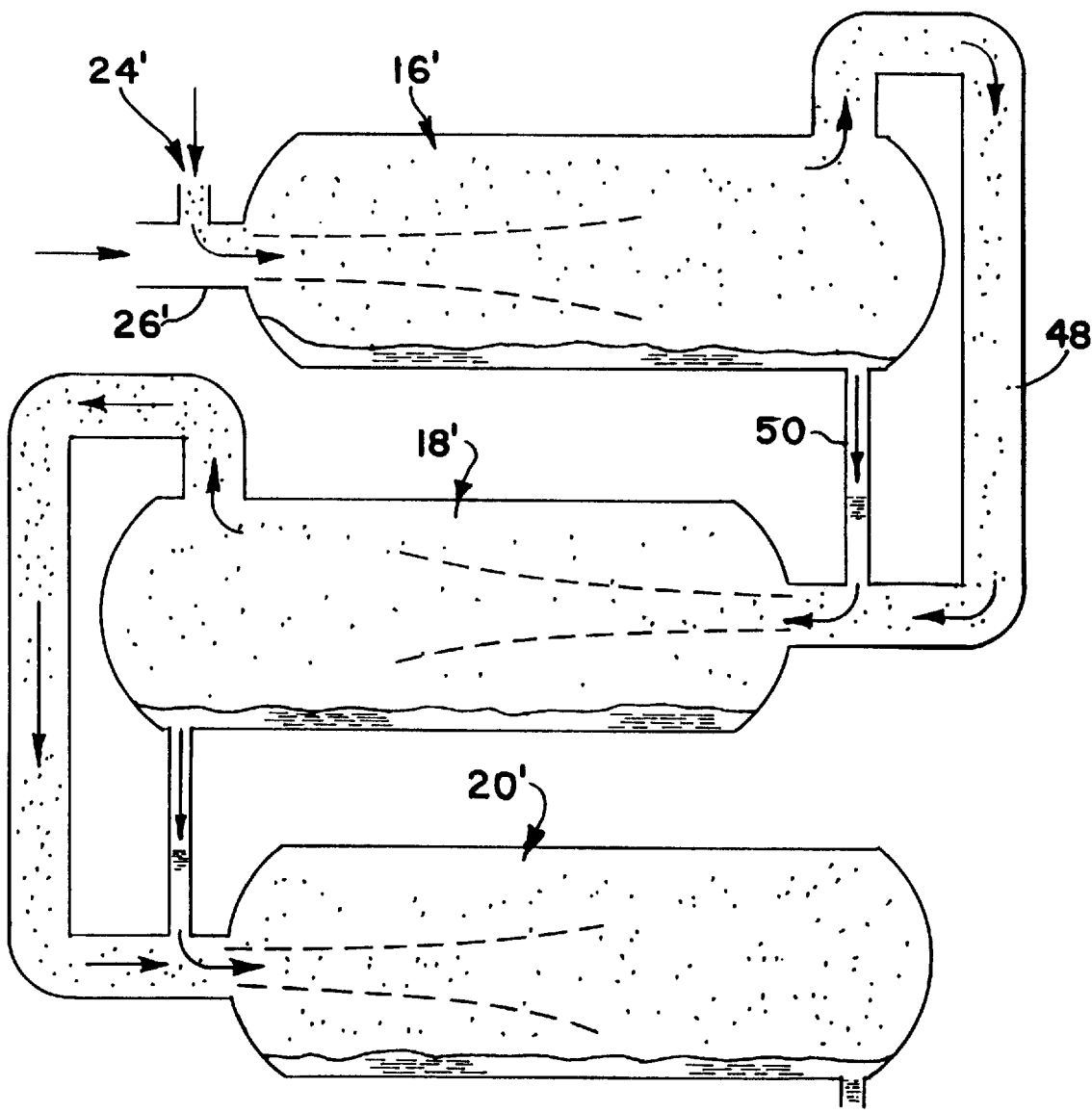
FIG. 3 is a simplified elevational view of another form of air stripping apparatus for practicing the method of my invention.

Referring now to the embodiment of my invention illustrated in FIG. 1, a vertical PVC tube forms a columnar tank 10 which may be between six and twelve inches in diameter. The tank has end caps 12 and 14 secured thereto. The tube illustrated is shown to provide four different separated expansion chambers 16, 18, 20 and 22. The number of expansion chambers is dependent upon the liquid being decontaminated and the type and amount of contaminants to be removed. Contaminated water is introduced into the tank through a water inlet 24. High velocity air is introduced into an air inlet 26 adjacent the water inlet 24. The water and air volumes and velocities will vary depending on the particular liquid being decontaminated, the extent of the contamination and the desired end purity of the liquid upon completion of the decontaminating process. The mixture at the inlets 24 and 26 creates a coarse spray pattern that thoroughly blends the air and water and forms a highly efficient air/water interface.

For purposes of understanding this invention, let us assume that water is contaminated with an unacceptable amount of gasoline in the amount of 100 parts of gasoline to 1,000,000 parts of water (100 ppm), and that an acceptable decontamination for the intended next use of the decontaminated water will be in the reduced range of 6–8 ppm. The air flow can come from a conventional high velocity centrifugal blower (not shown) or, if desired, can be from a source of vacuum (not shown) connected to an exit end 28 for contaminant-laden air leaving the system. The air and water inlets are simple tubes which form a nozzle that has sufficiently large orifices to effectively avoid clogging due to mineralization and contaminant collection. The air velocity in the illustrative example is 5000 feet per minute (fpm) at the inlet 26 and the water infeed into the inlet 24 is 10 gallons per minute (gpm). Addressing what results within the expansion chambers before discussing how it occurs, approximately 50% of the 100 ppm contaminant will be removed from the water and become airborne by molecular attraction to the air in each chamber. This means that each successive chamber will result in reducing the contaminants in the water to 50 ppm as it exits from chamber 16, 25 ppm after exiting chamber 18, 12.5 ppm after exiting chamber 20 and finally 6.25 ppm after the water leaves chamber 22. Therebeyond, the mist of air and water leaves the tank 10 through a tube 30 and enters the bottom of an air/water separation chamber 32. Contaminant-laden air and water bubbling through water 34 in separation chamber 32 leaves through the air exit end 28, while decontaminated water leaves through a water discharge pipe 36 to wherever it is to be conveyed. Assuming the percentage of removal were to be exactly 50% at each chamber, water leaving at pipe 36 will contain 6.25 ppm of gasoline, while 93.75 parts of gasoline will have been extracted along with the air passing through exit end 28. That contaminated air can be treated in conventional ways not directly pertinent to this invention, and has therefore not been shown nor will it be described. This broadly describes the process in connection with the apparatus of FIG. 1, now let us refer to how the system functions at each individual expansion chamber.

As high velocity air and water leave their respective inlets 26 and 24 and enter the expansion chamber 16, the two are combined and converted to a spray illustrated by dotted lines. This immediately causes a portion of the contaminating substance in the water to blend molecularly with the air as the mixture enters chamber 16. The spray then contacts an impingement plate 38 located centrally of the chamber. Impingement acts to further convert the spray into a finer blending mist, which then tends to reflect back upwardly somewhat toward the spray entrance, but is inhibited from doing so by continued entry of spray through the inlets 24 and 26. The finer spray spreads outwardly to deposit water droplets on the inside surface of the chamber 16. Water runs and is then forced downwardly toward a central opening 40 in a focusing plate 42. The water flows to the inside peripheral edges of the opening 40. The downward air flow in the now-pressurized chamber 16 causes contaminant-laden air to flow through the center of the opening 40, again combining the water and air at the opening 40 to create a further spray as they enter the next-following expansion chamber 18. The opening 40 thus acts as a further large nozzle orifice. It can be seen from FIG. 1 that this action is repeated in as many expansion chambers as are provided. For this reason, the impingement action and the recombination and the further recombining of air and water to create a new spray at each successive opening in each focusing plate will not be further described. It should be understood that the entire apparatus between the inlets 24 and 24 and the exit end 28 are fully enclosed and thus pressurized.

Assuming the percentage reduction of contamination actually takes place as stated previously, water exiting from tank 10 into tube 30 has but about 6 ppm of the original 100 ppm contaminant remaining. The other 94 ppm has become airborne at that point, and is caused, along with the water, to enter the bottom of the separation chamber 32. An attempt is made via the drawing to illustrate that the air flow during the processing of the contaminated water is such that only a small amount of water is contained at the bottom of the tube 30. The air and water are forced by pressure into the separation chamber, and the air bubbles to the water surface. This action results in a demisting of the bubbles, eliminating the need to supply a demisting stack intermediate the separation tank and the exhaust system that extracts the contaminant-laden air. It also provides for additional contaminant removal. The level of water within the separation chamber 32 can be maintained by any known means to any desired height to produce the most effective results. Water is constantly drawn off at the water discharge pipe 36 as the process progresses and is conveyed therefrom to a reservoir or disposal where decontaminated water is transported.

FIG. 2 is an enlargement of a portion of the tank 10 showing the manner in which the impingement and focusing plates 38 and 42 are interconnected by means of threaded alignment rods 44 and nuts 46. The enlargement corresponds to that portion of FIG. 1 contained within the dot-dash circle 2. The plates 38 and 42 are provided with drilled holes to enable the rods to pass through them inside the outer edges of the impingement plates 38 and just outwardly of the openings 40 in the focusing plates 42. The diameter of the impingement plates 38 and their spacing relative to the focusing plates is optional to perform whatever is found to best provide for appropriate flow of water and air through the expansion chambers. I have found that a circular impingement plate that is one-third the diameter of the tank 10 performs well. The focusing plates are annular and of an outside diameter that allows clearance between their outer peripheries and the inside cylindrical wall of the tank to accommodate natural build-up of iron and minerals on the inside wall. The clearance should be sufficient to allow plates 38 and 42 and their interconnecting alignment rods 44 to be easily installed and removed axially as a unit, even with mineral build-up. If desired, a gasket (not shown) may be provided between each focusing plate periphery and the tank wall. For example, the clearance could be as much as a quarter of an inch, and a flat, annular gasket or washer applied to each focusing plate 42. When the unit is installed or removed, the edges of the gaskets would flex, making removal easier and facilitating resealing upon reinstallation. To accommodate such removal, the tank may be disconnected between its ends at any convenient location, shown here simply as a dotted-line coupling 47 at the upper end of the tank 10. When the coupling 47 is decoupled, the upper end of the tank 10 may be removed and the entire assembly of rods 44 and plates 38 and 42 lifted upwardly. While the construction of nozzles or orifices through which contaminated water must pass is of such large size that internal cleaning is seldom required, provision is made so that the function can be simply and easily accomplished if necessary. The unitary interconnection of plates 38 and 42 allows cleaning to be done without much equipment down time. The system is essentially self-cleaning during processing of contaminated water and thus requires little or only nominal maintenance. The enlarged view of FIG. 2 shows what occurs as water recollects at the bottom of each expansion chamber, as visually observed in a test unit having a transparent tank wall.

An alternate apparatus for performing the claimed method is illustrated in FIG. 3. This construction preceded the design of FIG. 1 in time and is designed for a low, compact air stripper where vertical space is at a premium. It consists of three separate expansion chambers 16', 18' and 20' that are interconnected by separate piping 48 for air and 50 for water in which the air and water flow recombines between adjacent chambers. As air and water enter the first chamber 16', they are converted to a spray. Spray droplets recollect into a liquid about ½ inch deep at the bottom of each chamber and drain through the piping 50 through the combined force of gravity and chamber air pressure. Contaminant-laden air in the chamber is forced by the air pressure through the piping 48 to a point where a second nozzle is formed at the juncture of water passing from the lower end of piping 50. This new spray created at the entrance to the expansion chamber 18' causes the entire contaminant-reduction process to be repeated. As noted earlier, repetition reduces the contaminated organic compound by approximately 50% in each chamber. The discharge from the last of the expansion chambers can be like that exiting from tube 30 of FIG. 1, from which the air/water flow would go into a separation chamber and water and air collectors, respectively. With chamber diameters of perhaps six to eight inches in the FIG. 3 construction and the collection apparatus at one side thereof, the entire unit can be kept to a height of as low as three feet or less. This compares to an apparatus of six or more feet high for an average size operation of the FIG. 1 design. If desired, impingement plates may be provided in any or all of chambers 16', 18' and 20' and each expansion chamber may be constructed to enable disassembly. The piping 48 and 50 of the FIG. 3 design performs a function essentially like that of the focusing plates 42 of the FIG. 1 design.

While I have illustrated two different designs of apparatus for carrying out the method of air stripping according to my invention, various other changes within the scope of my invention and claims will become apparent to those skilled in this art. Also, while the method and apparatus were described solely in connection with removal of volatile organic compounds from waste water, their use for other types of contaminants and liquids other than water will be apparent to persons skilled in this art.

Having described my invention, I claim:

1. The method of volatizing a volatile compound from a non-volatile liquid during passage of the liquid sequentially through a series of interconnected, enclosed expansion chambers from an inlet at one end of said series to an outlet at the opposite end thereof and separately collecting the volatile compound and at least partially decontaminated non-volatile liquid at said outlet, said inlet and said outlet and interconnections intermediate said expansion chambers all having reduced-size cross-sectional dimensions relative to the cross-sectional dimensions of said expansion chambers, said method comprising:

introducing a stream of air into said inlet at a velocity sufficient to convert a stream of liquid with which the air comes into contact into a mist;

introducing a stream of said liquid into said air stream at said inlet to create a first spray of said liquid into said first expansion chamber of said series, thereby releasing a first volume of the volatile compound from said liquid into the air;

reconstituting at least a major portion of said spray into a liquid stream at the interconnection of said first and a second expansion chamber of said series and utilizing the continuing air flow toward said outlet to create a second spray of said liquid during passage through said interconnection and into said second expansion chamber, thereby releasing a second smaller volume of the volatile compound from said liquid and combining said second volume with the first volume of the volatile compound in said second expansion chamber;

repeating said reconstituting step at any following expansion chamber to thereby add to the volume of volatile compound released by the moving air from said liquid; and separately collecting the volatile compound-laden air and decontaminated liquid adjacent the outlet of said series of expansion chambers.

2. The method according to claim 1 wherein said liquid is water.

3. The method according to claim 2 wherein said compound is a volatile organic liquid.

4. The method according to claim 1 including the additional step of passing the air and liquid, after the final reconstituting step, through decontaminated liquid in a separation chamber to demist the air.

5. Apparatus for practicing the method according to claim 1 wherein each of said interconnections between successive expansion chambers after the first chamber is essentially at the end of that chamber which is upstream of the air flow therebetween, whereby said reconstitution of liquid into a spray occurs by gravity flow of said liquid through said interconnection into the next-following expansion chamber.

6. Apparatus for practicing the method according to claim 1 wherein said chambers have common end walls at their interconnections, and wherein each said wall comprises a central opening therethrough.

7. Apparatus for practicing the method according to claim 6 wherein said expansion chambers are elongated and are aligned vertically.

8. Apparatus for practicing the method according to claim 1 wherein each of said interconnections includes a liquid conduit below the level of liquid collecting in the upstream chamber and an air conduit connecting the outlet end of the upstream chamber to the inlet end of the next-adjacent expansion chamber, whereby said liquid conduit and air conduit form nozzles creating the spray of liquid into said latter expansion chamber.

9. Apparatus for practicing the method according to claim 8 wherein said expansion chambers comprise a vertical stack of horizontally-elongated expansion chambers, wherein said first expansion chamber is at the top of the stack and the second and any successive chambers descend directly therebeneath, and wherein the interconnecting conduit between adjacent expansion chambers extends outwardly and downwardly from one to the next-adjacent expansion chamber.

10. Apparatus for practicing the method according to claim 1 including providing an impingement plate at the inlet to each chamber, said plate being positioned within range of the incoming spray to further disperse the spray and assist in stripping volatile compound from the spray droplets.

11. Apparatus for practicing the method according to claim 10 wherein said expansion chambers are produced by providing an elongated hollow tubing and positioning an assembly of alternate impingement plates and focusing plates within said tubing, said focusing plates each having a central opening constituting a reduced cross-sectional dimension of said interconnections.

12. Apparatus for practicing the method according to claim 11 including means for disconnecting said tubing intermediate its ends, said disconnecting means enabling removal of said assembly for cleaning or maintenance.

13. Apparatus for practicing the method of claim 1 wherein a plurality of said chambers are provided, and wherein said chambers are elongated and are arranged generally parallel and horizontally.

14. The method of stripping contaminants from water by utilization of air, comprising the steps of:

providing a plurality of expansion chambers each having a first inlet and a first outlet for air flow therethrough and a second inlet and second outlet for water flow therethrough, said chambers being sequentially in line with respect to flow of air and water therethrough;

introducing a stream of air into the first inlet of a first expansion chamber at a velocity sufficient to convert a stream of liquid with which the air comes into contact into a mist;

injecting contaminated water into the second water inlet of said first expansion chamber, said injecting being directly into the air stream passing through the first inlet of said first expansion chamber whereby to convert the water into a high velocity spray;

each expansion chamber being essentially enclosed except for the first and second air and water inlets, whereby the spray in each chamber is enabled to expand into the major portion of each chamber and enable water droplets to recombine by gravity and collect in a minor portion of the chamber at the bottom thereof;

said first air outlet of each expansion chamber being independent of the level of water collecting therein and said second water outlet being located below the water level;

providing for continued exiting flow of air from the first air outlet of the first expansion chamber to a first air inlet of a second expansion chamber;

providing for continued exiting flow of water from the second water outlet of the first expansion chamber to a second water inlet of said second expansion chamber;

introducing water into the air stream entering the second expansion chamber whereby to create a second spray of air and water as they are both introduced into the second expansion chamber;

repeating the foregoing steps in any downstream expansion chamber provided at the air and water outlets of said second expansion chamber;

at the end of the final expansion chamber, collecting water and air exiting from the first and second outlets in a separation chamber;

draining decontaminated water at a first level from said separation chamber; and collecting air and volatile contaminants extracted from the water by means of high velocity air at a second level above the water level in said separation chamber.

15. The method according to claim 14 wherein said air flow is created by means of pressure at the first inlet of the first expansion chamber.

16. The method according to claim 14 wherein the air and water inlets of each chamber introduce the air and water at essentially right angles.

17. The method according to claim 14 including the additional step of passing the air and water through the decontaminated liquid in the separation chamber to demist the air.

* * * * *